United States Patent [19]

Suzuki

[11] 4,313,478
[45] Feb. 2, 1982

[54] WOOD WORKING ROUTER

[75] Inventor: Yukitomo Suzuki, Hamamatsu, Japan

[73] Assignee: Helan Iron Works, Ltd., Hamamatsu, Japan

[21] Appl. No.: 76,791

[22] Filed: Sep. 18, 1979

[51] Int. Cl.³ .............................................. B23B 7/04
[52] U.S. Cl. ...................... 144/1 A; 29/36;
 83/451; 269/21; 409/189; 409/192; 409/201; 409/203
[58] Field of Search ............... 409/189, 190, 191, 192, 409/201, 203, 205, 213, 217; 29/36, 40, 47; 269/21; 83/451; 408/35, 53; 144/1 A, 150

[56] References Cited

U.S. PATENT DOCUMENTS

| 1,449,450 | 3/1923 | Segler | 409/189 |
|---|---|---|---|
| 2,347,791 | 5/1944 | Onsurd | 144/1 A |
| 3,080,794 | 3/1963 | Grabes | 144/134 B |
| 3,483,796 | 12/1969 | Galbarini et al. | 409/216 |
| 3,830,584 | 8/1974 | Ohlig | 29/40 X |
| 3,880,047 | 4/1975 | Dosier | 83/451 |
| 4,060,016 | 11/1977 | Gerber | 83/451 |
| 4,187,601 | 2/1980 | Aldrin | 409/191 |
| 4,205,835 | 6/1980 | Gerber | 83/451 |

*Primary Examiner*—W. D. Bray
*Attorney, Agent, or Firm*—Holman & Stern

[57] ABSTRACT

A wood working router which comprises a plurality of turret heads adapted to be selectively operated and each having a plurality of radially and outwardly extending tools and the corresponding number of motors for driving the individual tools, a mechanism associated with each turret head for intermittently rotating the turret head so as to move a selected one of the tools to the processing position each time the turret head is rotated, and a workpiece holding and releasing device for holding a workpiece on a sucking table by suction and releasing the workpiece from the sucking action.

6 Claims, 10 Drawing Figures

WOOD WORKING ROUTER

BRIEF SUMMARY OF THE INVENTION

This invention relates to a wood working router and more particularly, to a wood working router of the type which comprises a plurality of turret heads to be selectively operated. Each of the turret heads has a plurality of tools extending radially and outwardly thereabout and the corresponding number of motors associated with the individual tools for rotating the tools and is adapted to be intermittently rotated so as to move a selected one of the tools to the processing position where the selected tool is held each time the turret head is rotated into position and rotated by the associated motor for performing a desired multi-step processing operation on a wood workpiece held in position on a workpiece holding table.

There have been proposed and practically employed a number of wood working routers. However, most of the prior art wood working routers have the disadvantages that the turret head can not be smoothly and positively rotated, that chips generated in a particular processing operation tend to scatter about to pollute the environment and a workpiece can not be positively and firmly held on the table during the processing operation.

Therefore, the present invention is to provide a novel and improved wood working router which can effectively eliminate the disadvantages inherent in the prior art wood working routers.

One object of the present invention is to provide a wood working router in which the turret heads can be smoothly and positively rotated.

Another object of the present invention is to provide a wood working router which is provided with means for preventing generated chips from scattering about by sucking the chips to thereby eliminate the possible environmental pollution.

A still further object of the present invention is to provide a wood working router which is provided with means for positively holding a workpiece on the table under suction.

The above and other objects and attendant advantages of the present invention will be more readily apparent to those skilled in the art from a reading of the following detailed description in conjunction with the accompanying drawings which show one preferred embodiment of the invention for illustration purpose only, but not limiting the scope of the same in any way.

BRIEF DESCRIPTION OF THE SEVERAL VIEWS OF THE DRAWINGS

The drawings furnished herewith illustrate the best mode presently contemplated by the applicant for carrying out the invention.

In the drawings.

DETAILED DESCRIPTION

Figure 1:
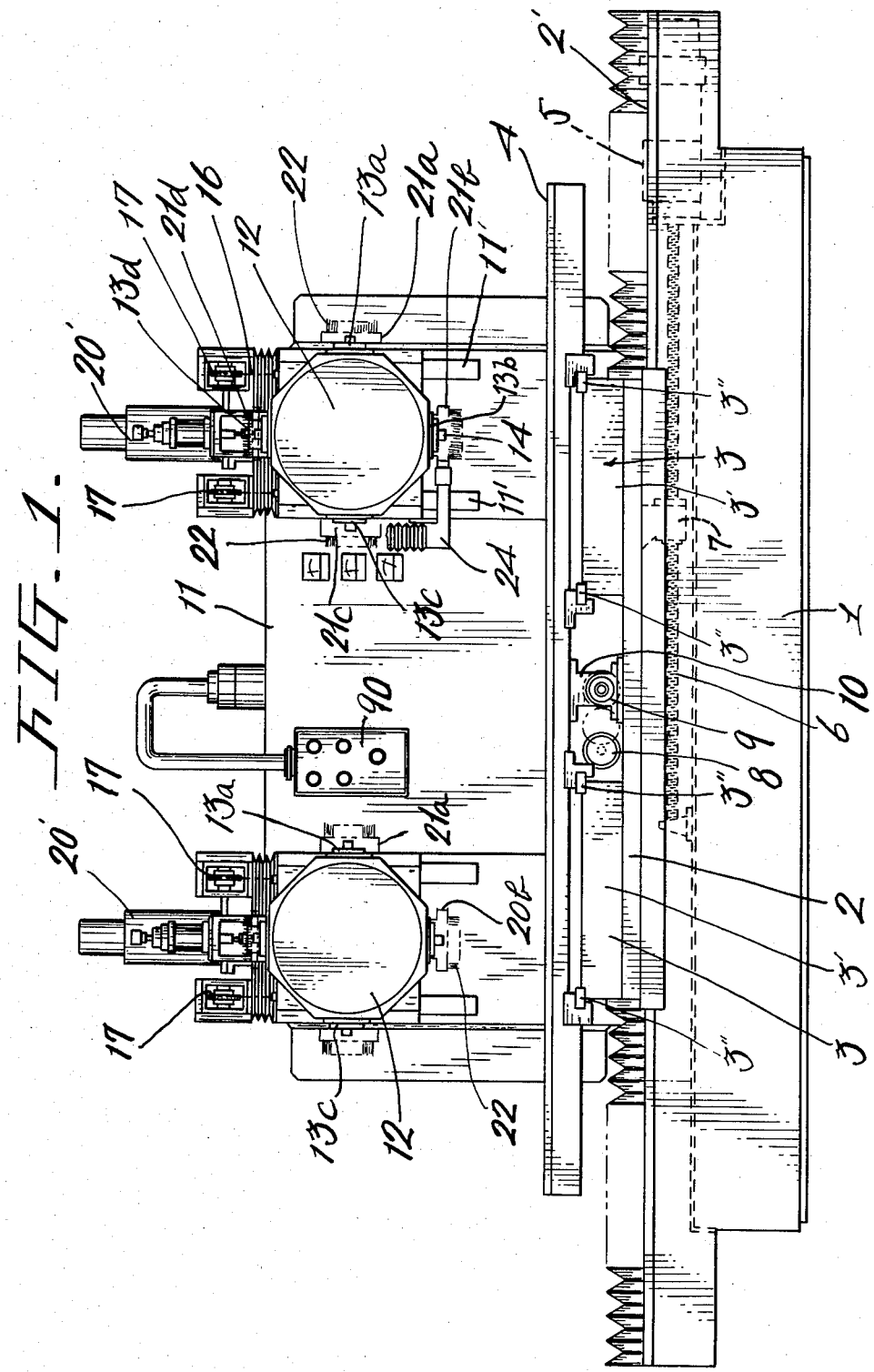
FIG. 1 is a front elevational view of one preferred embodiment of wood working router constructed in accordance with the present invention.
Figure 2:
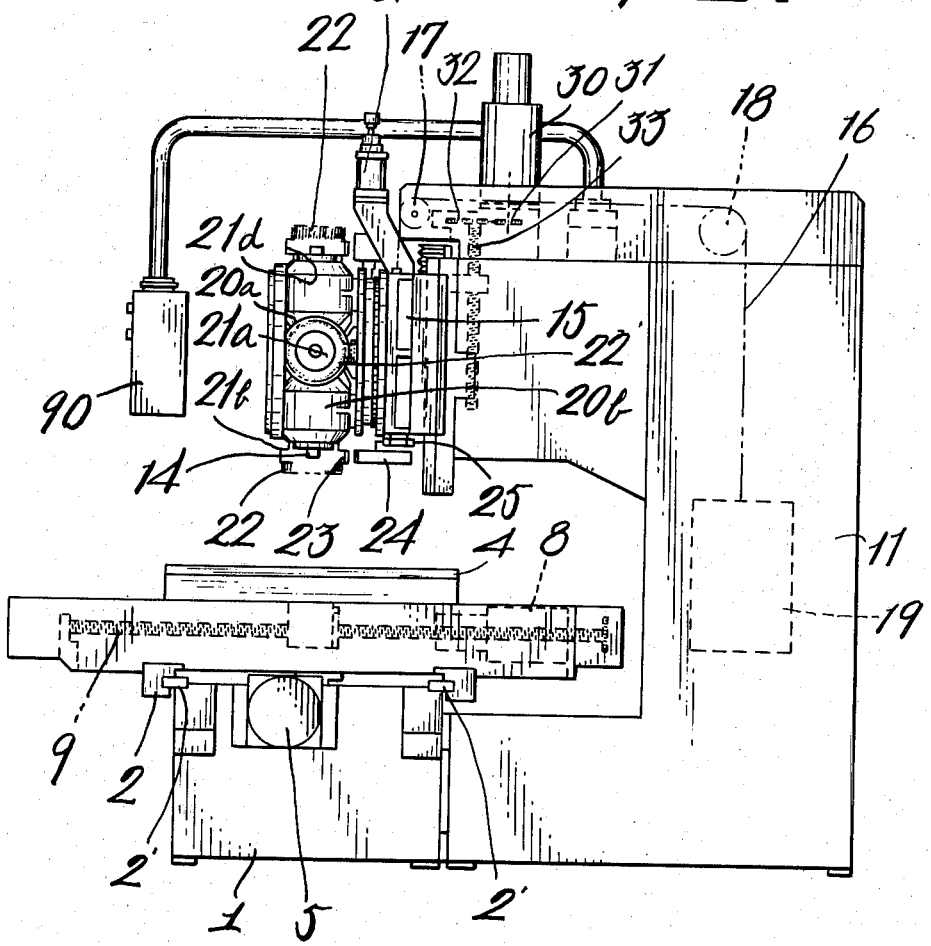
FIG. 2 is a side elevational view of said wood working router as shown in FIG. 1.
Figure 3:
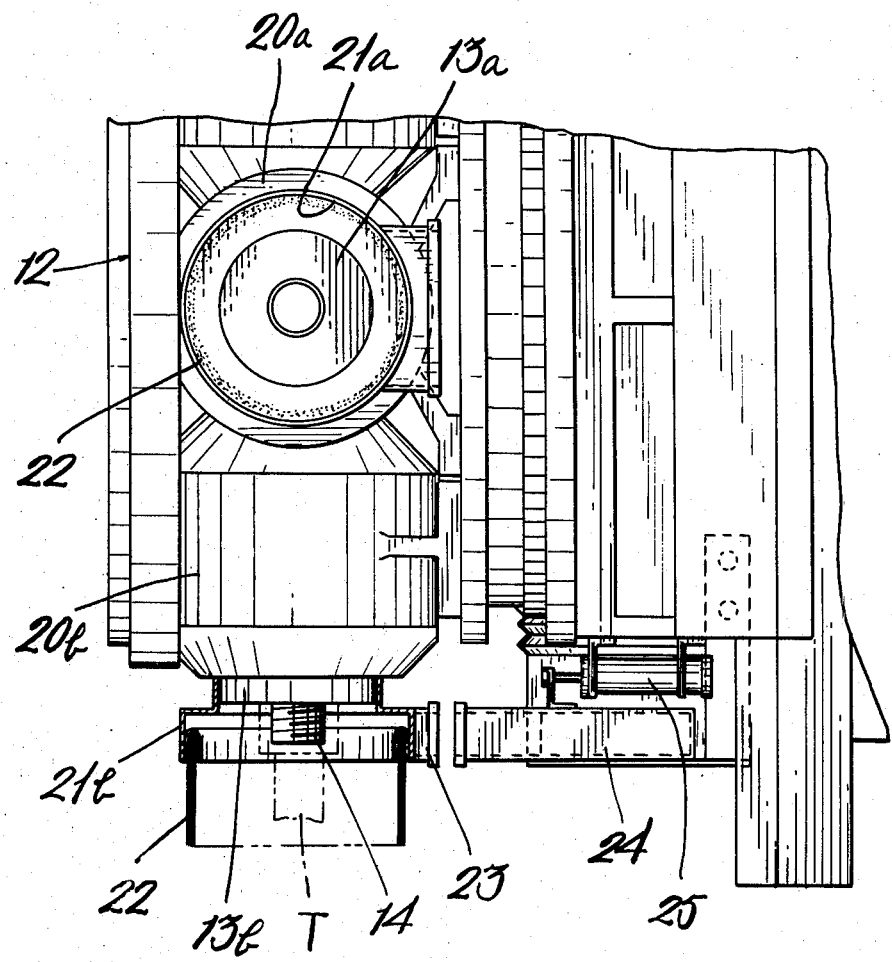
FIG. 3 is a fragmentary front elevational view on an enlarged scale of the chip suction device in the wood working router.
Figure 4:
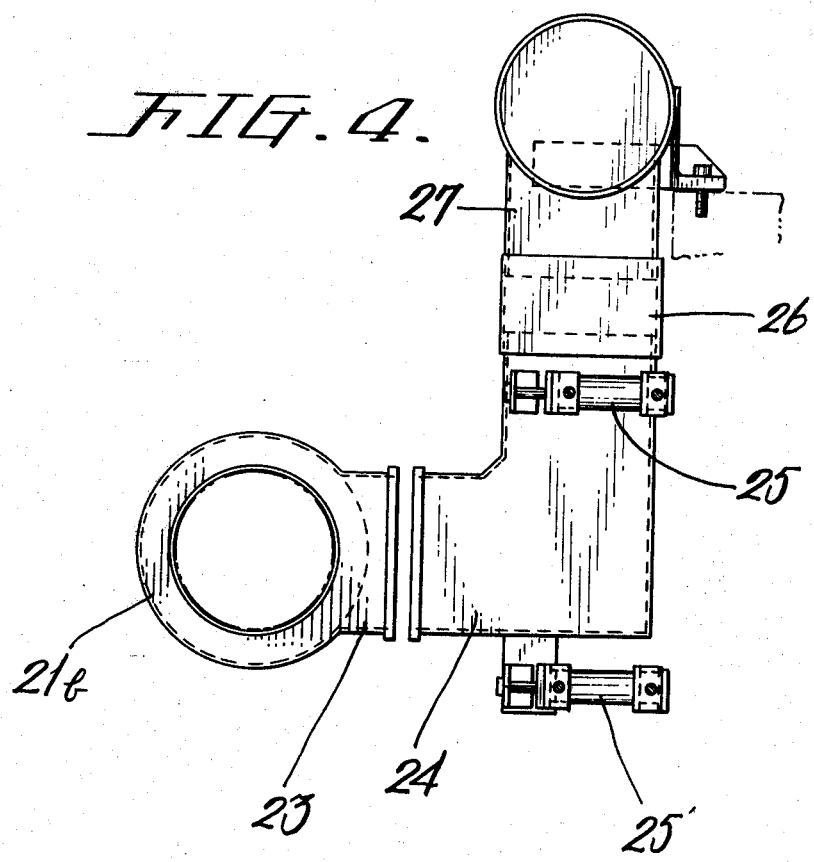
FIG. 4 is a plan view of said chip suction device as shown in FIG. 3.

The present invention will be now described referring to the accompanying drawings which illustrate one preferred embodiment of a wood working router which incorporates various features of the invention. The embodiment of the wood working router as shown in FIG. 1 generally comprises a machine base 1 on which a table carriage 2 is supported for movement in the rightward and leftward directions (as seen in FIG. 1) along a pair of rails 2' provided on the machine base 1 by means of drive means as will be described hereinbelow for moving a suction-type workpiece holding table 4 (the details of the table will be described hereinafter) in the rightward and leftward directions. A second table carriage 3 is integrally formed with the upper surface of the first table carriage 2 for moving the workpiece holding table 4 in transverse directions normal to the movement directions of the first table carriage 2 by means of drive means as will be described hereinbelow.

The first table carriage 2 is moved along the rails 2' by drive means which comprises a motor 5 suitably mounted on the machine base 1, an externally threaded rod 6 adapted to be driven by the motor 5 and extending between and secured to a pair of opposite and spaced support brackets which are in turn fixedly mounted on the machine base 1 below the first carriage 2 and an internally threaded projection 7 secured to and depending from the undersurface of the carriage for threadably recieving the externally threaded rod 6.

Thus, as the first and second table carriage assembly 2,3 is moved in the rightward and leftward directions as seen in FIG. 1, the table 4 is also moved in these directions. The second table carriage 3 comprises a pair of opposite and spaced similar portions 3' and 3'. The table 4 is also moved in the directions normal to the rightward and leftward directions relative to the first and second table carriage assembly while the assembly remains stationary.

For this purpose, a motor 8 is suitably mounted on the carriage 2 and an externally threaded rod 9 adapted to be rotated by the motor 8 extends between and is rotatably supported in a pair of support brackets which are in turn secured to the carriage 2. The externally threaded rod 9 extends between the second table carriage portions 3', 3' and an internally threaded bracket 10 is secured to and depends from the undersurface of the workpiece holding table 4 in the center thereof for threadably receiving the externally threaded rod 9.

A column 11 of substantially inverted U-shaped cross section is secured to and extends uprightly from the machine base 1 and a pair of similar turret heads 12,12 are supported on the column 11 in spaced side-by-side relationship by means of which description will be made hereinafter. The turret heads 12 are supported on the column 11 for intermittent rotational and vertical movement relative to the column in the manner as will be described hereinafter. Each of the turret heads 12 has a plurality of hollow tool mounting members 13a,13b,13c,13d (four tool mounting members in the illustrated embodiment) which extend radially and outwardly from the associated turret head 12 in an equal annularly spaced relationship to be employed in succession. The column 11 has two pairs of turret head guides 11' 11' in the form of outwardly extending projections on the inner surface along which the turret heads 12,12 move vertically. Each of the turret heads 12 is vertically moved along each one pair of turret head guides 11' by means as will be described hereinafter.

Since the two turret heads 12 are identical with each other, description will be made of only one of the turret heads 12,12 and its associated parts hereinafter with the understanding that the description will be also applicable to the other turret head and its associated parts.

The turret head 12 has an integral support base 15 which is slidably mounted on the turret head guides 11', 11' by means as will be described hereinafter, and the inner ends of a pair of spaced chains 16 are secured to the top of the turret head support base 15. Each of the chains 16,16 are guided over sprockets 17,18 which are in turn rotatably supported on the column 11 and has a balance weight 19 secured to the outer end thereof.

The turret head 12 slidably supported on the column 11 by means of the support base 15 is also rotated in the manner as will be described hereinafter so as to move the four tool mounting members 13a,13b,13c and 13d in succession to the workpiece processing position (in the illustrated embodiment, the tool mounting member 13b is shown in the workpiece processing position). Tool drive motors 20a,20b,20c,20d are associated with the four tool mounting members 13a,13b,13c,13d, respectively, for rotating the tools and have tool mounting portions 20' (the tool mounting portion 20' associated with only the tool mounting member 13d is shown).

Annular chip suction members 21a,21b,21c,21d are secured to the outer periphehery of the tool drive motors 20a,20b,20c,20d, respectively, surrounding the associated drive motors and cyrindrical brushes 22 extend outwardly from the chip suction members 21a,21b,21c,21d.

Reference numeral 23 denotes the suction opening formed in each of the suction members 21a,21b,21c,21d and reference character T denotes a tool received in the respectively associated tool mounting member and surrounded by the associated brush 22. The tools in the tool mounting members 13a,13b,13c,13d are in succession employed to perform different processing works on a wood workpiece. A L-shaped suction pipe 24 is movably mounted on the turret head 12 in association with each suction member 21 and adapted to be moved into contact with and away from the suction opening 23 in the suction member 21 which has been moved to the workpiece processing position. For the purpose, air cylinders 25,25' are mounted on the shorter and longer legs of the L-shaped suction pipe 24, respectively to advance and retract the suction pipe 24, to and from the suction member 21. The suction pipe 24 is connected through a rubber tube 26 to a connection member 27 which is in turn connected to a suitable vacuum pump (not shown), for example.

Thus, when a desired processing operation is to be performed on a wood workpiece, the turret head 12 is intermittently rotated so as to present the tools T in succession to the processing position above the work holding table 4 and when a particular tool has been moved to the processing position or the lowest position as shown in FIG. 1, the air cylinders 25, 25' are operated to move the L-shaped suction pipe 24 towards the suction member 21 and the vacuum pump is operated to cause the pipe to contact the suction member. While the tool T is performing the desired processing work on the wood workpiece, chips are generated from the workpiece and the thus generated chips are sucked by the suction member 21 and the suction pipe 24 be accumulated to at a selected area to be removed from the router later and also prevented from scattering about by the brush 22 surrounding the tool T.

Figure 5:
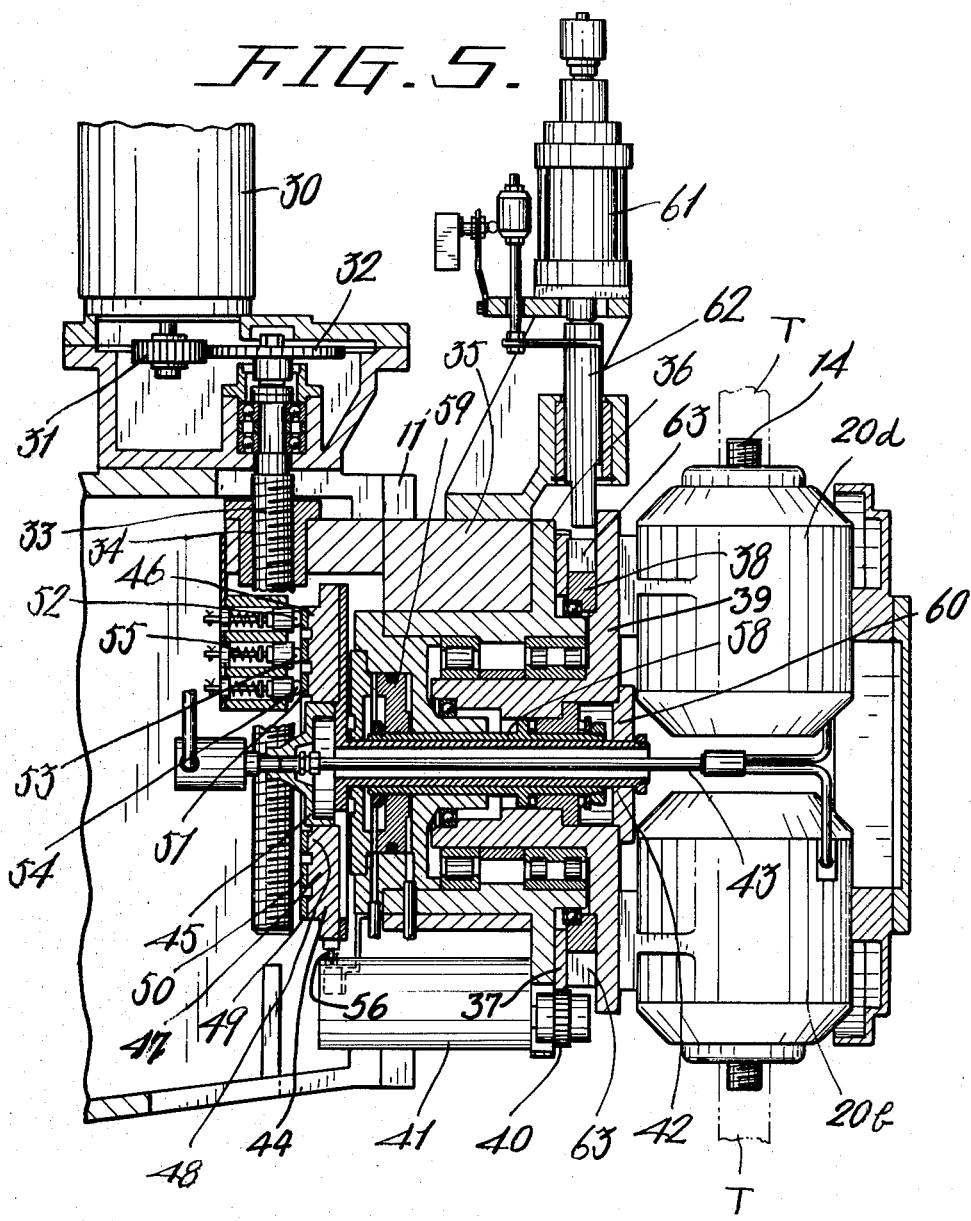
FIG. 5 is a fragmentary vertically sectional view on an enlarged scale of the mechanism for selectively rotating the turret head in the wood working router as shown in FIG. 1.
Figure 6:
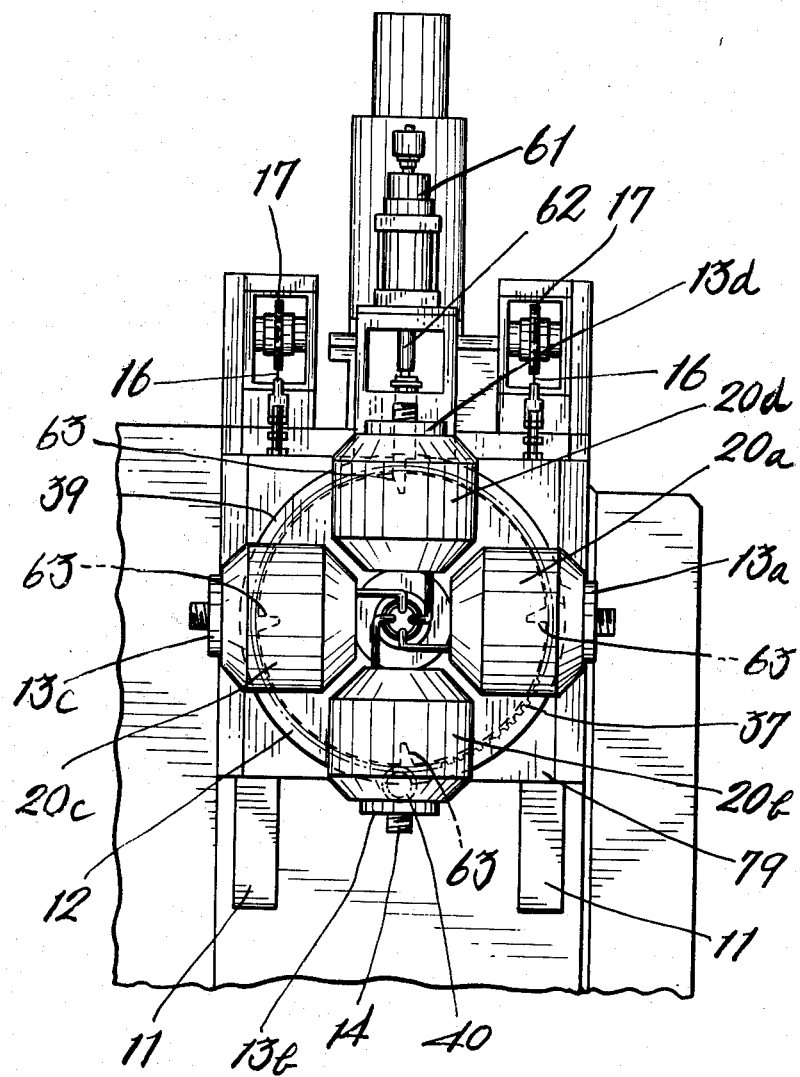
FIG. 6 is a fragmentary front elevational view on an enlarged scale of the cutting tool selection mechanism in the wood router as shown in FIG. 1.
Figure 7:
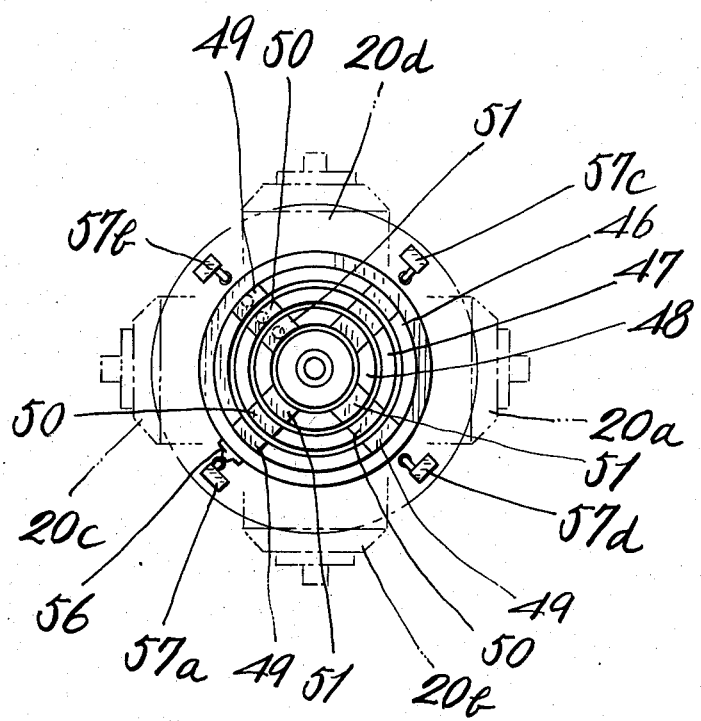
FIG. 7 is a fragmentary view of a portion of said cutting tool selection mechanism as shown in FIG. 1.

Now, description will be made of the mechanism for vertically moving, intermittently rotating the turret head 12 and selecting a tool out of the tools suitable for performing a desired processing, as shown in FIGS. 5-7 of the accompanying drawings.

In FIG. 5, reference numeral 30 denotes a motor adapted to move the turret head 12 vertically along the turret head guides 11'. The motor is operatively connected through a pinion 31 and a mating spur wheel 32 to a threaded rod 33 which is threadably received in an internally threaded sleeve 34 in a support plate 35 which is in turn fitted in the column 11 and when the motor 30 is energized, the turret head 12 is moved vertically along the guides 11'. A rotary support bracket 36 is provided in the column 11 and support plate 35 and a relatively larger gear 37 is provided in contact with the adjacent surface of the support bracket 36. The gear 37 is secured to a ring 38 received in an annular member 39 which supports the tool drive motors 20a,20b,20c, 20d.

Provided in engagement with the gear 37 is a pinion 40 which is in turn operatively connected to a motor 41 to be driven thereby. The energization of the motor 41 rotates the turret head 12 through the pinion 40 and gear 37 about the axis of a sleeve 42 through which the shaft 43 of the turret head 12 extends and in which the shaft 43 is journalled by suitable bearings (not shown). A conductive disc 44 is mounted at one end of the sleeve 42 by means of an intermediate member 45 fitted about the end of the shaft 43 and three coaxial annular ribs 46,47 and 48 are formed on the outer surface of the conductive disc 44. Three sets of conductive pieces 49,50 and 51 are arranged in an angularly spaced relationship and securred to the coaxial annular projections 46,47 and 48, respectively. Contacts 52,53 and 54 are in contact with the conductive pieces 49,50 and 51, respectively, under the action of springs 55. A projection 56 is provided on the outer peripheral surface of the conductive disc 44 to be selectively engaged by one of four angularly spaced limit switches 57a,57b,57c and 57d and when one of the four limit switches 57a, 57b,57c and 57d engages the projection 56, the rotation of the turret head 12 is stopped and current is provided to the tool drive motor associated with the cutting tool which is then positioned in the workpiece processing position resulting in the rotation of the tool T. An outer sleeve 58 is snuggly fitted about the sleeve 42 and a piston 59 is provided about the outer sleeve 58 at one end thereof. When air is supplied to the piston 59 on the right-hand surface thereof as seen in FIG. 5 from a suitable air supply means (not shown), piston 59 pulls the sleeves 58 and 42 together leftward as seen in FIG. 5 and as a result, a connector plate 60 provided about the inner sleeve 42 at the end thereof opposite from the piston 49 and connecting between the annular member 39 and inner sleeve 42 pulls the annular member 39 whereby the gear 37 is pressed against the ring 38. At the same time, a cylinder 61 is actuated to cause its stop bar 62 to extend downwardly to enter into one of recesses 63 formed in the periphery of the annular member 39 to thereby hold the turret head 12 in the stopped position.

Figure 8:
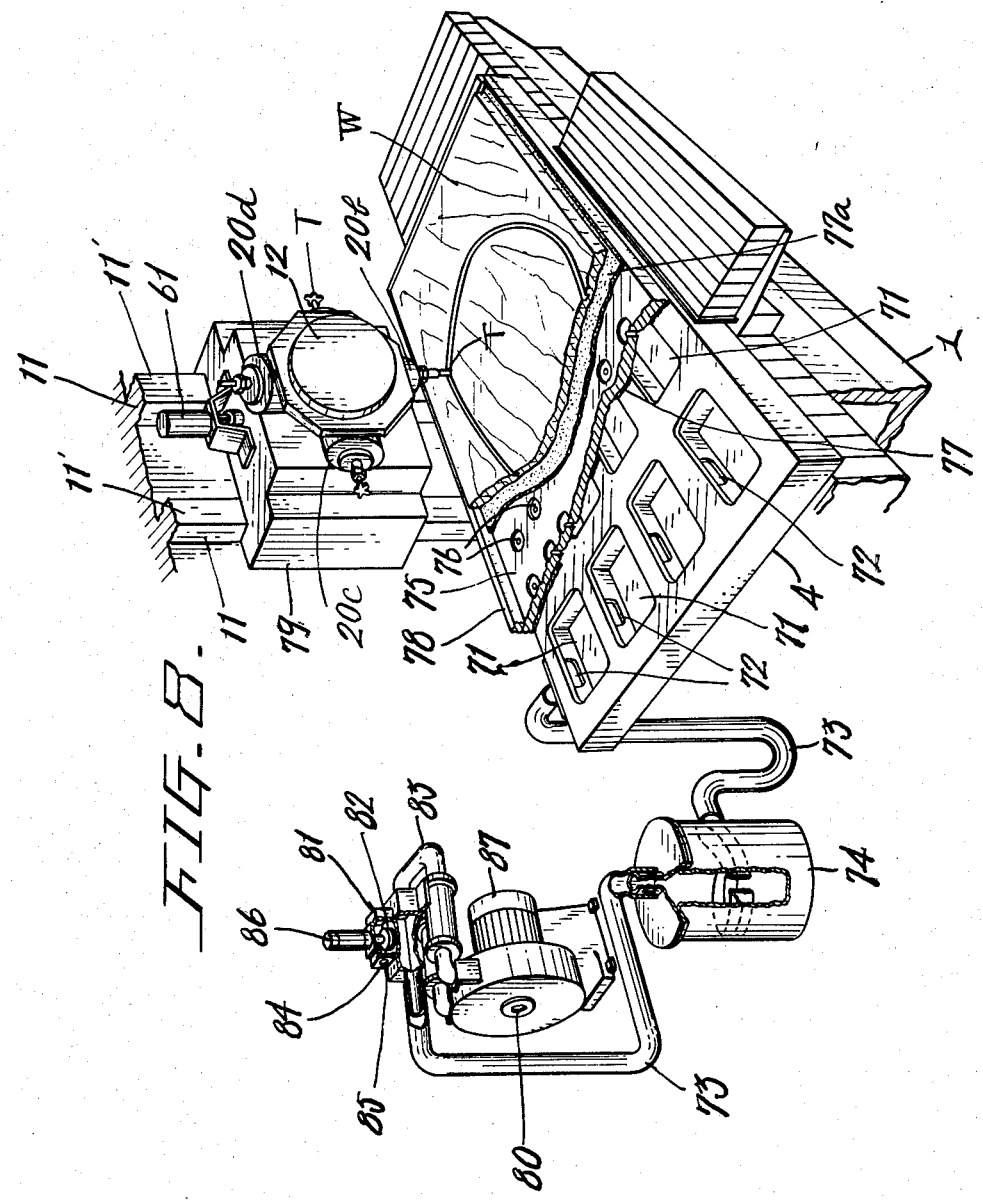
FIG. 8 is a perspective view on an enlarged scale of the workpiece release device in the wood working router as shown in FIG. 1.
Figure 9:
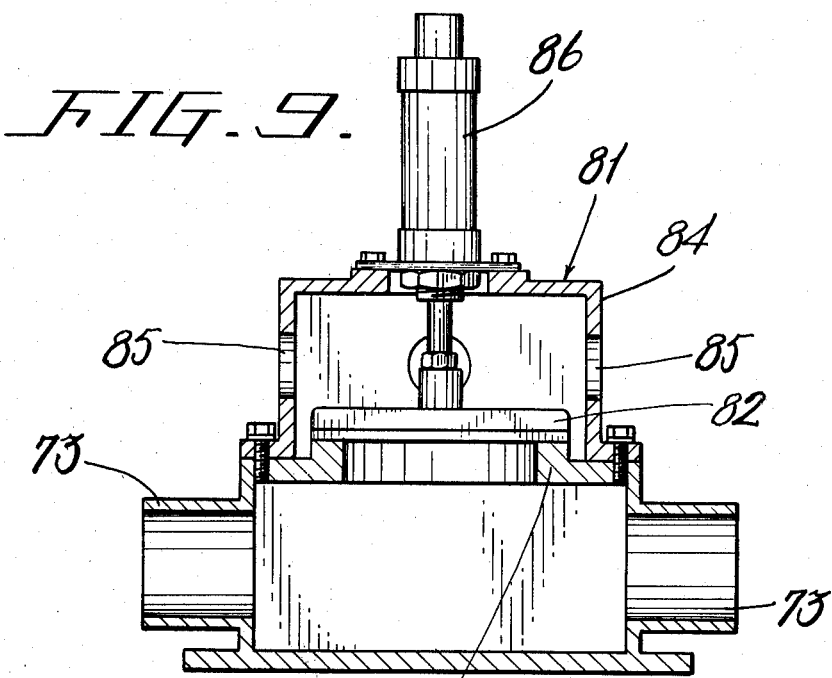
FIG. 9 is a fragmentary vertical sectional view on an enlarged scale of the release valve employed in the workpiece release device as shown in FIG. 8.
Figure 10:
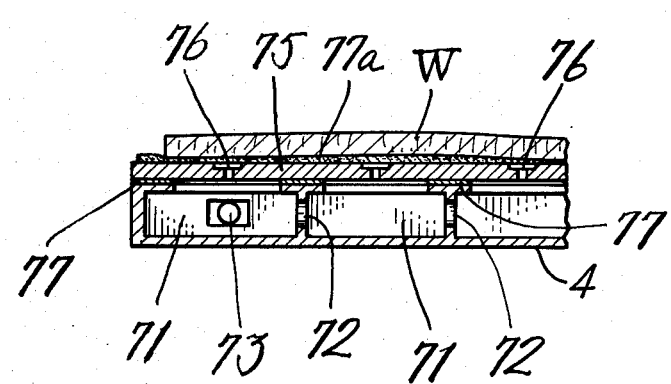
FIG. 10 is a vertical sectional view on an enlarged scale of a portion of said suction-type workpiece holding table as shown in FIG. 1.

Now, description will be made of the release device for the suction type workpiece holding table 4 referring to FIGS. 8 through 10 of the accompanying drawings.

As mentioned hereinabove, the table is adapted to move in the rightward and leftward directions relative to the machine base 1 (as seen in FIG. 1).

A series of recesses 71,71 ... is formed in the upper surface of the table 4 and the recesses are open on the top and in communication with each other by means of communication holes 72 provided in one of the side walls of the recesses 71. A suction pipe 73 is connected at one end to the side wall communication hole 72 in one of the recesses 71 and the other end of the pipe extends through an air cleaner 74 to a vacuum pump 80. A synthetic resin workpiece protection sheet 75 is secured to the table upper surface with a porous packing sheet 77 interposed therebetween and has a number of small holes 76, which are in communication with the recesses 71 in the table 4.

A similar porous packing sheet 77a is applied to the upper surface of the protection sheet 75 on which a workpiece W is supported. Thus, when a workpiece W is placed on the suction table 4 and the vacuum pump 80 is actuated, the vacuum action provided by the vacuum pump 80 can easily and positively hold the workpiece on the table 70. Rulers 78 are provided at and project upwardly from the side and end edges of the workpiece protection sheet 75. Reference numeral 79 denotes a slide which slidably moves along the guides 11' of the column 11 and on which the turret head base 15 is mounted and reference numeral 61 denotes a cylinder adapted to engage the turret head 12 to hold the turret head in position during the processing operation. A release valve 81 is provided in a portion of the suction pipe 73 for communicating between the interior of the pipe 73 and the atmosphere and the release valve has a valve member 82 which is received within a valve casing 84 having windows 85 and actuated by an air cylinder 86. Reference numeral 87 denotes a computer-operated motor for driving the vacuum pump 80, and reference numeral 88 denotes a valve seat.

Thus, as soon as a predetermined or desired processing work has been completed on the workpiece, the motor 87 is stopped by a computer (now shown) and the release valve 81 is opened to thereby communicate the recesses 71 in the suction table 70 and the small holes 76 in the protection sheet 75 with the atmosphere and thus, the processed workpiece is rapidly released from its suction-retained state on the table and ready for removal from the table. The two turret heads 12, 12 are selectively operated by manipulating a common selector switch 90 which is mounted on the column 11 between the turret heads and also adapted to select a particular tool of the four tools suitable for performing a desired processing on the workpiece.

From the foregoing description on the preferred embodiment of the present invention, it will be understood that according to the present invention, the chips generated during the processing operation are effectively prevented from scattering about to thereby eliminate the potential environmental pollution and the workpiece can be precisely held in the processing position on the table 70 under stabilized condition to thereby assure a smooth and effective processing operation. Furthermore, even when the workpiece to be processed has a warped area or areas, the workpiece can be firmly held on the table during the processing operation and as soon as the release valve is opened, since the workpiece can be easily and rapidly released from its suction-retained state, the workpiece removal efficiency is substantially improved.

While only one embodiment of the present invention has been shown and described in detail, it will be understood that the same is for illustration purpose only and is not to be taken as a limitation of the invention, reference being had for this purpose to the appended claims.

What is claimed is:

1. A wood working router comprising a machine base, a table carriage unit movable in a first direction relative to said machine base, a suction-type workpiece holding table unit movable in said first direction together with said table carriage unit and also in a second direction normal to said first direction relative to the carriage unit, a column secured to and extending uprightly from said machine base, at least one turret head mounted on said column for vertical movement and rotation relative to the column and having a plurality of angularly spaced cutting tools extending radially and outwardly about the turret head, a corresponding number of motors attached to said cutting tools for individually driving the tools, a mechanism for intermittently rotating and vertically moving said turret head and selecting said cutting tools on the turret head and a release mechanism for releasing a workpiece held on said suction-type table unit under suction from the table unit.

2. The wood working router as set forth in claim 1, further including chip collecting means for preventing chips from scattering about.

3. The wood working router as set forth in claim 2, in which said chip collection means includes, a brush disposed about said cutting tool, a suction member surrounding said brush, a vacuum operated movable suction pipe movable towards and away from said suction member and air cylinder means mounted on said suction pipe for moving the suction pipe towards and away from the suction member.

4. The wood working router as set forth in claim 1, in which said suction-type table unit includes a table having a plurality of recesses in the upper surface and communication holes formed in selected walls of said recesses, a synthetic resin protection sheet secured to the upper surface of said table with a first porous sheet interposed between the protection sheet and table and having a plurality of small holes in communication with said recesses and a second porous sheet on the upper surface of said protection sheet.

5. The wood working router as set forth in claim 1, in which said rekease mechanism includes a pipe connected at one end to one of said communication holes and a release valve provided at an intermediate point between said one end and the other end of the pipe.

6. A wood working router comprising at least one turret head mounted for rotation about a horizontal axis having mounted thereon a plurality of cutting tools extending radially and outwardly from the head and a corresponding number of motors to which the individual tools are attached to be rotated by the motors, a mechanism for intermittently rotating said turret head to successively move said cutting tools to the processing position and successively holding said cutting tools in the processing position, an annular suction member surrounding each said motor having said cutting tool attached thereto for removing chips by suction generated by the processing operation by the cutting tool and having a suction opening and a suction pipe in communication with a vacuum device and adapted to move into contact with or away from said suction opening of the annular suction member, and a workpiece holding suction table for holding a wood workpiece in said processing position while a multi-step cutting operation is performed on said workpiece.

* * * * *